(12) United States Patent
Augenstein et al.

(10) Patent No.: US 7,441,147 B2
(45) Date of Patent: Oct. 21, 2008

(54) SYSTEM AND METHOD FOR STORING AND RESTORING A DATA FILE USING SEVERAL STORAGE MEDIA

(75) Inventors: Oliver Augenstein, Dettenhausen (DE); Thomas Prause, Weil I.Schoenbuch (DE)

(73) Assignee: International Business Machines Corporation, Armonk, NY (US)

( * ) Notice: Subject to any disclaimer, the term of this patent is extended or adjusted under 35 U.S.C. 154(b) by 462 days.

(21) Appl. No.: 11/286,649

(22) Filed: Nov. 23, 2005

(65) Prior Publication Data

US 2006/0150013 A1 Jul. 6, 2006

(30) Foreign Application Priority Data

Dec. 22, 2004 (EP) .................................. 04106883

(51) Int. Cl.
*G06F 11/00* (2006.01)

(52) U.S. Cl. ..................................... 714/6; 714/7; 714/8

(58) Field of Classification Search .................. 714/6–8
See application file for complete search history.

(56) References Cited

U.S. PATENT DOCUMENTS

| 6,067,635 | A * | 5/2000 | DeKoning et al. ............. 714/6 |
| 2003/0177324 | A1* | 9/2003 | Timpanaro-Perrotta ..... 711/162 |
| 2004/0078641 | A1* | 4/2004 | Fleischmann .................. 714/6 |

* cited by examiner

*Primary Examiner*—Robert Beausoliel
*Assistant Examiner*—Charles Ehne
(74) *Attorney, Agent, or Firm*—Dillon & Yudell LLP

(57) ABSTRACT

A system and method for storing and restoring a data file using several storage media. The method begins with the step of generating several identical copies of the data file. The identical copies are stored on different storage media. The identical copies are subdivided into data portions according to a predetermined scheme. Selected data portions are simultaneously read out via different data channels from at least two different storage media. The data file is restored from the selected data portions.

2 Claims, 9 Drawing Sheets

SYSTEM AND METHOD FOR STORING AND RESTORING A DATA FILE USING SEVERAL STORAGE MEDIA

PRIORITY CLAIM

This application claims priority of German Patent Application No. DE 04106883.4, filed on Dec. 22, 2004, and entitled, "Method for storing and restoring a data file using several storage media."

BACKGROUND OF THE INVENTION

1. Technical Field

The present invention relates in general to the field of data processing systems. Particularly, the present invention relates to a method for storing and restoring data within a data processing system.

2. Description of the Related Art

To protect a data file it is necessary to make at least one copy, which is stored on a separate storage medium. For important data usually several identical copies of a data file are made. The copies are simultaneously stored and distributed on separate storage media. It is also possible that the additional copies are created in a second step by creating copies from the first copy. Only a first copy is used to restore the data file normally. The other copies are invisible and a user cannot easily access to those copies. However, if the first copy or its storage medium is corrupted or unavailable, one of the other copies may be used to restore the data file. It is important to note that the data is typically but not mandatory stored on sequential storage media.

A first example of a conventional method for storing and restoring a data file is shown in FIG. 6 and FIG. 7, respectively.

The store performance is shown in FIG. 6 as a schematic representation. In FIG. 6 several identical copies of the data file 40 are simultaneously stored on separate and independent storage media 41, 42, 43 and 44, respectively. The data file 40 is written on storage media 41, 42, 43 and 44 via data channels 51, 52, 53 and 54, respectively. The copies on the storage media 41, 42, 43 and 44 are identical with the data file 40.

FIG. 7 shows the according schematic representation of a conventional restore performance of the data file 40. One of the identical copies on the storage media 41, 42, 43 and 44 is used to restore the data file 40. In this example the copy on the third storage medium 43 restores the data file 40. The copy on the storage medium 43 is read out via the third data channel 53. The copies on the other storage media 41, 42 and 44 remain unused. However, if the currently used storage medium 43 is corrupted or unavailable, a copy on one of the other storage media 41, 42 and 44 may be used to restore the data file 40. In this case the time for restoring the data file 40 increases, since the copy of the complete data file 40 has to be read out again.

During the restore performance in FIG. 7 at first a list of possible data sources is created. Then this list is sorted in such a way, that the first entry in the list is the preferred copy, from which the data file 40 may be restored. While the list is not empty, said first entry is extracted from the list. Then the data file 40 is restored from the copy corresponding to said extracted entry. If the data file 40 is completely restored, the restore performance is stopped. But if not all data could be restored due to an error, the restore performance is continued with the next entry of the list. If the list is empty, an error message is sent.

The conventional method according to FIG. 6 and FIG. 7 requires a lot of time for restoring the data file 40 in general. And in particular, if an error occurs, additional time is required, since the restore performance has to be repeated.

A second example of the conventional method for storing and restoring the data file is schematically shown in FIG. 8 and FIG. 9, respectively.

According to said method different data portions of the data file 40 are distributed on the different storage media 41, 42, 43 and 44. FIG. 8 shows the storing of the data file 40 and FIG. 9 shows the restoring of the data file 40.

In the store performance according to FIG. 8 at first the data file 40 is divided into equal sized data portions 61, 62 and 63. Each of the data partitions 61, 62 and 63 is then associated with one storage medium 41, 42, and 43, respectively. At last the data portions 61, 62 and 63 are moved to the storage media 41, 42, and 43 via the data channels 51, 52 and 53, respectively.

FIG. 9 shows schematically the restoring of the data file 40. At first the storage media 41, 42, and 43, which contains the data portions 61, 62 and 63, respectively, are looked up. Next each data portion 61, 62 and 63 is associated with that location, where the data portion 61, 62 and 63 is to be restored to. At last said different data portions 61, 62 and 63 are read out simultaneously via the data channels 51, 52 and 53, respectively, to restore the data file 40.

If only one of the storage media 41, 42 and 43 in FIG. 9 is corrupted or unavailable, it is not possible to restore the original data file 40. Therefore, there is a need for a method of an improved method of storing and restoring data in a data processing system that addresses the limitations of the above.

SUMMARY OF THE INVENTION

The main idea of the present invention is, that all available identical copies of the data file on different storage media may be used for the restore performance. These copies are subdivided into data portions. Several different data portions of the data file are read out simultaneously from different storage media. This allows a fast restore performance.

Every storage medium contains a copy of the complete data file, but only one data portion is read from one storage medium normally. However, if a storage medium is corrupted, the according data portion is then read out from another storage medium.

The data transfer rate is proportional to the number of data portions. The inventive method allows a very fast restore performance.

The above, as well as additional purposes, features, and advantages of the present invention will become apparent in the following detailed written description.

BRIEF DESCRIPTION OF THE FIGURES

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying figures, wherein:

DETAILED DESCRIPTION OF THE PREFERRED EMBODIMENT

Figure 1:
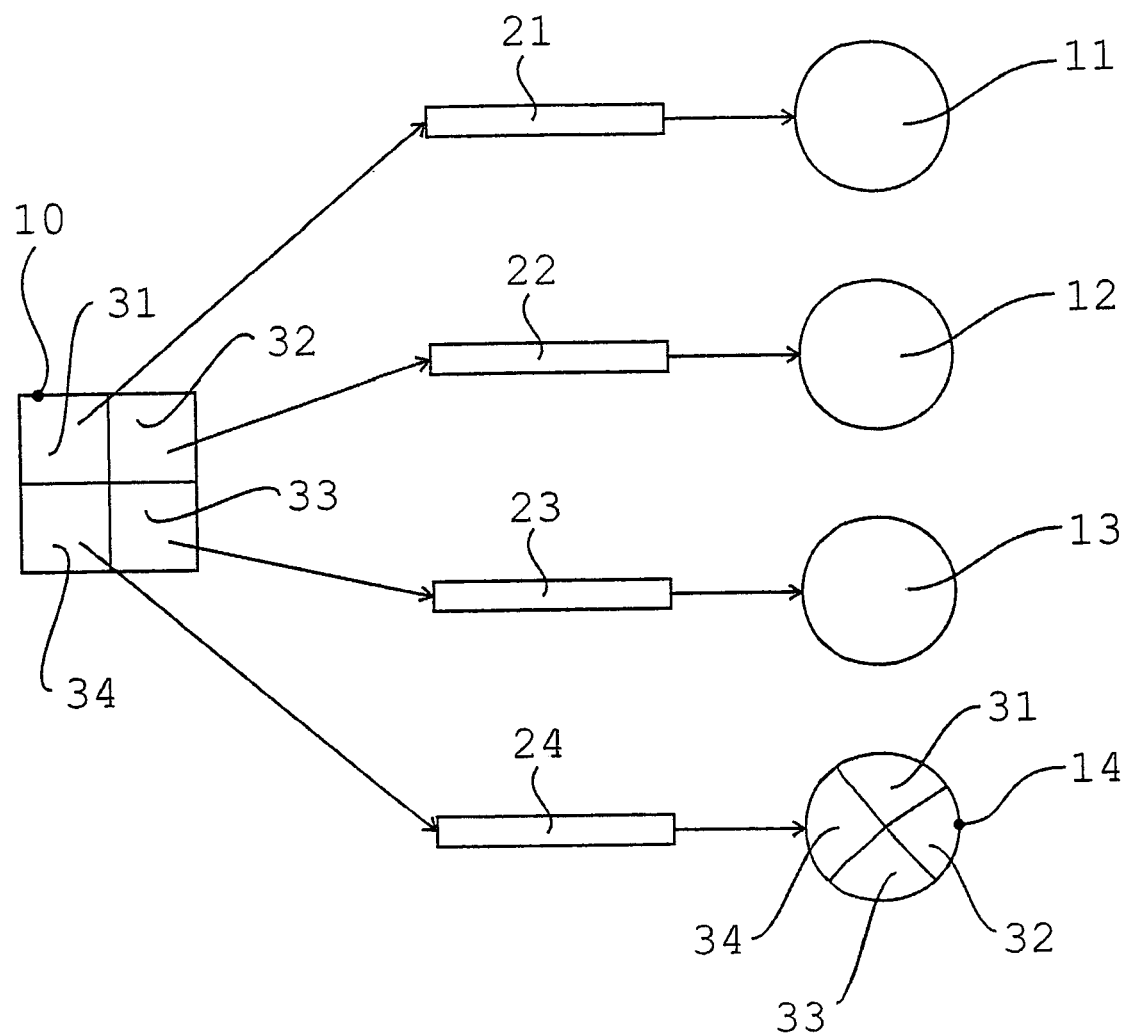
FIG. 1 shows a schematic representation of a store performance according to a preferred embodiment of the inventive method.

FIG. 1 shows a schematic representation of the store performance according to a preferred embodiment of the inventive method. A data file 10 is stored on several separate storage media 11, 12, 13 and 14. The storage media 11, 12, 13 and 14 are independent from each other. The data file 10 may be subdivided into four data portions 31, 32, 33 and 34. On every storage medium 11, 12, 13 and 14 an identical copy of the data file 10 is stored via data channels 21, 22, 23 and 24. Every data channel 21, 22, 23 and 24 corresponds to one of the storage media 11, 12, 13 and 14, respectively. On every storage medium 11, 12, 13 and 14 the copies of the data file are subdivided into four data portions 31, 32, 33 and 34. In FIG. 1 the data portions 31, 32, 33 and 34 are represented only in the fourth storage medium 14. In this embodiment all data portions 31, 32, 33 and 34 have substantially the same size. Every data portion 31, 32, 33 and 34 is assigned to one of the data channels 21, 22, 23 and 24, respectively.

Figure 2:
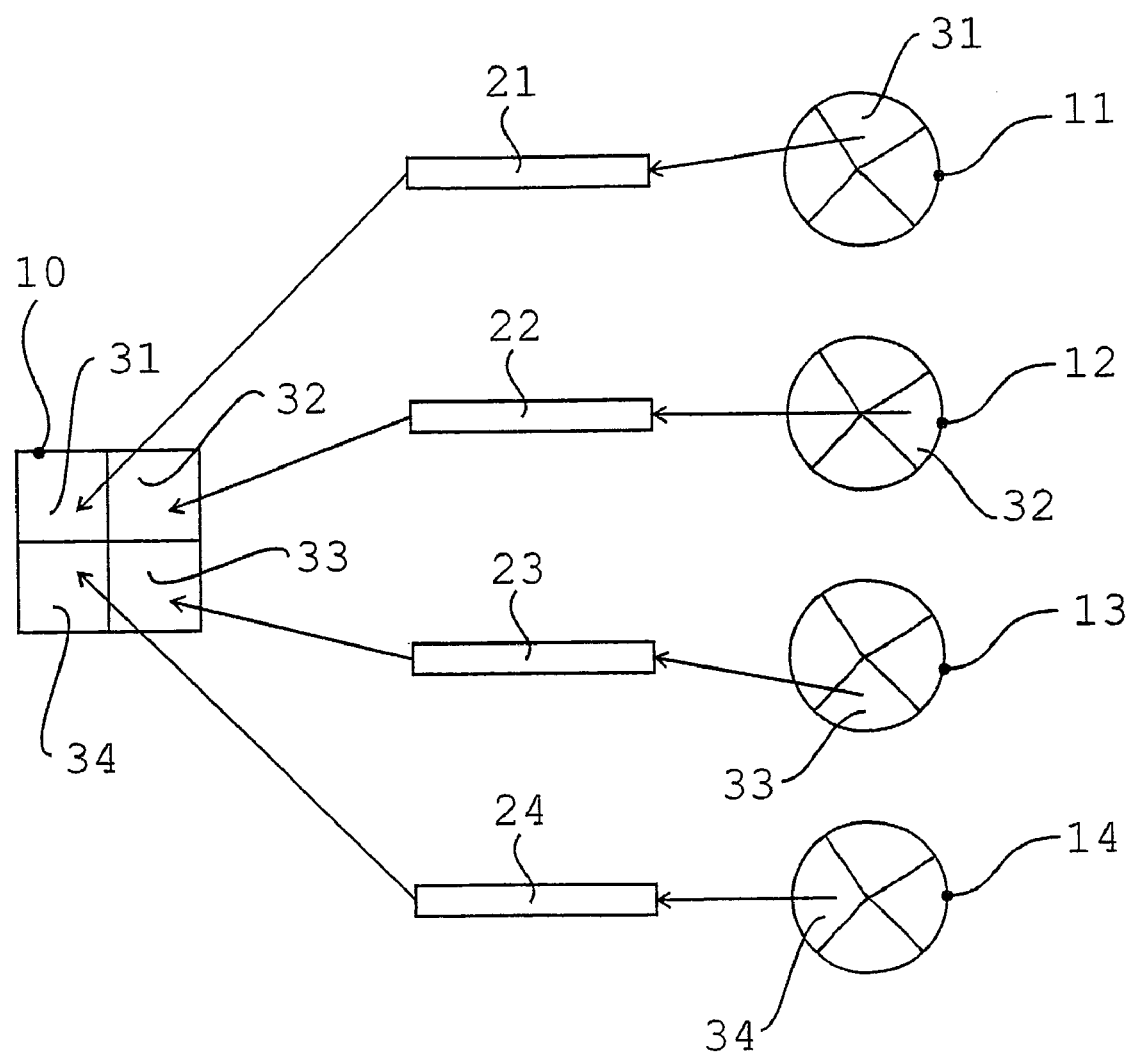
FIG. 2 shows a schematic representation of a restore performance according to the preferred embodiment of the inventive method.

FIG. 2 shows schematically the restoring of the data file 10. The copy of the data file 10 is read out simultaneously from every storage medium 11, 12, 13 and 14, wherein only one data portion is read out from every storage medium 11, 12, 13 and 14, respectively.

In this embodiment the first data portion 31 is read out from the first storage medium 11 via the first data channel 21. The second data portion 32 is read out from the second storage medium 12 via the second data channel 22. The third data portion 33 is read out from the third storage medium 13 via the third data channel 23. The fourth data portion 34 is read out from the fourth storage medium 14 via the fourth data channel 24. In this embodiment the number of the data portions 31, 32, 33 and 34 is identical with the numbers of the storage media 11, 12, 13 and 14 and data channels 21, 22, 23 and 24. This is not necessary in general.

Alternatively the number of the data portions 31, 32, 33 and 34 may be smaller than the number of the storage media 11, 12, 13 and 14. In this case not all of the storage media 11, 12, 13 and 14 are used during the restore performance normally. But if a storage medium 11, 12, 13, 14 is corrupted, the according data portion may be read from another storage medium 11, 12, 13, 14 without a substantial loss of time.

Figure 3:
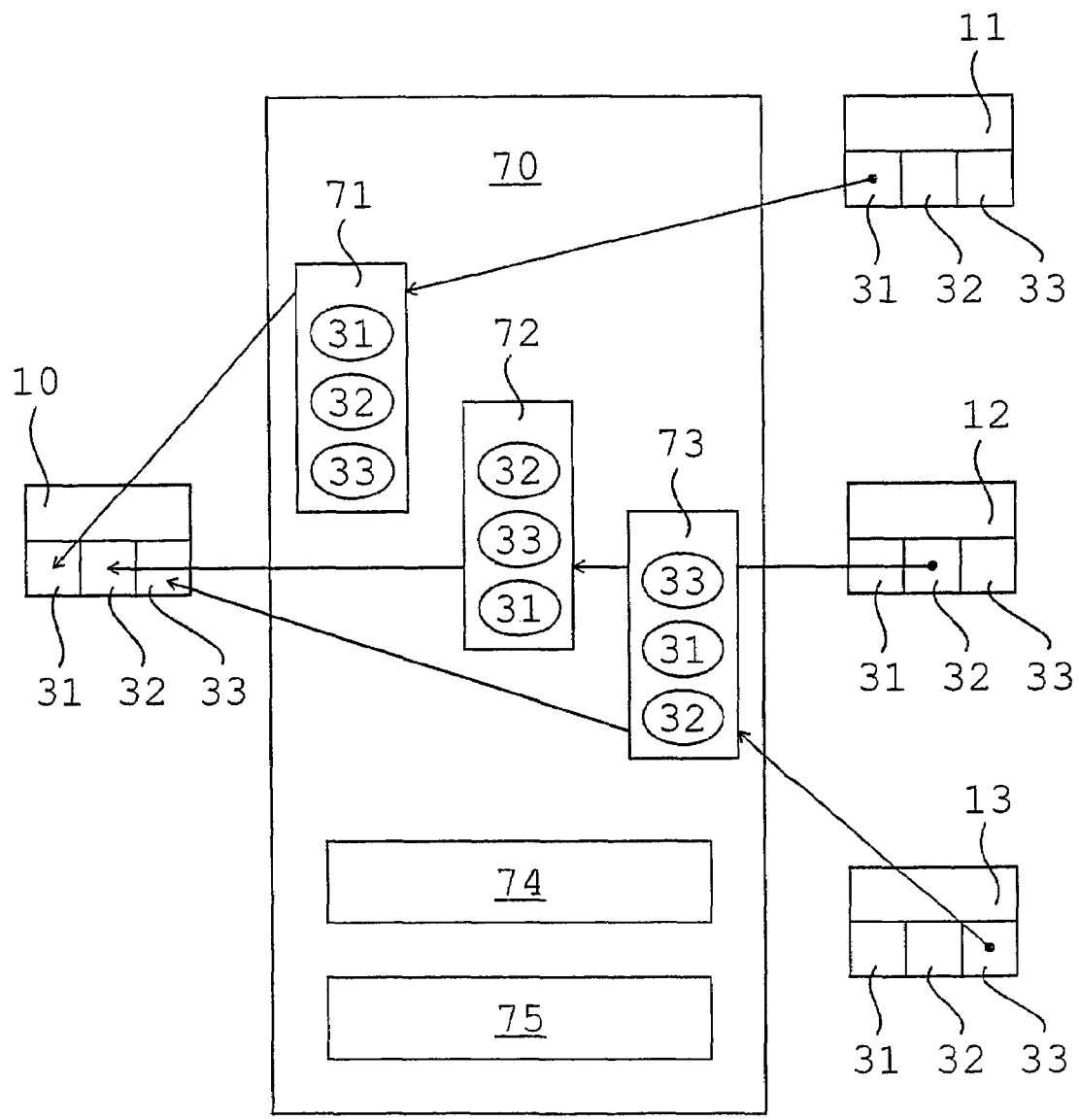
FIG. 3 shows a schematic representation of a system, which allows the restore performance according to the preferred embodiment of the inventive method.

FIG. 3 shows a schematic representation of a system, which allows the restore performance according to the present invention. The system comprises a fail-over manager 70, which is connected with the storage media 11, 12 and 13. The fail-over manager 70 includes a first list 71, a second list 72 and a third list 73. The fail-over manager 70 includes further a progress list 74 and a success list 75.

The first, second and third lists 71, 72 and 73 include entries, which correspond to the data portions 31, 32 and 33, respectively. The entries are tabled in a certain order. In every list of the first, second and third lists 71, 72 and 73 a different entry is on the top of said list.

Figure 4:
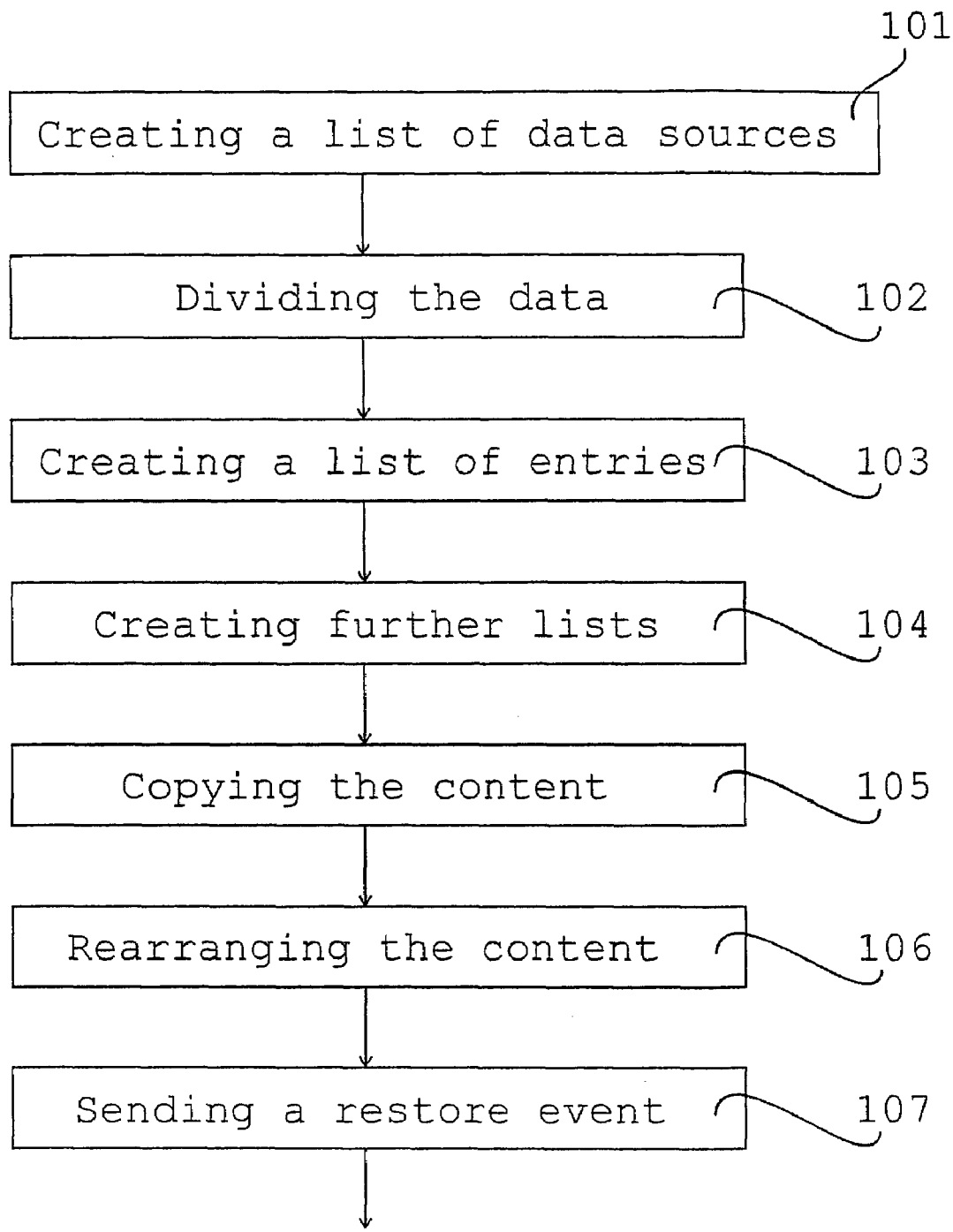
FIG. 4 shows a schematic representation of a flow chart diagram of the method according to the preferred embodiment of the inventive method.

FIG. 4 shows a flow chart diagram of the restore performance according to the invention using the system according to FIG. 3. In a first step 101 a source list is created, which comprises possible data sources. The source list is not shown in the figures. Each of said data sources contain a full copy of the data file 10. In this case the data sources are the storage media 11, 12 and 13.

In a second step 102 the data file 10, which shall be restored, is subdivided into equally sized data portions 31, 32 and 33. The number of the data portions 31, 32 and 33 must be equal to or smaller than the number of available copies on the storage media 11, 12 and 13. The step 102 may be done during the store performance as well as the restore performance.

In a further step 103 a master list is created. The master list is not shown in the figures. The master list contains one entry for each of the data portions 31, 32 and 33 created in the step 102. The entries in the list are sorted in such an order, which corresponds to an optimal restore sequence. For example, if the copies of the data file 10 are located on a tape, then such an order is preferred, which corresponds to the order on the tape.

In a next step 104 the first list 71, the second list 72 and the third list 73 are created. The number of the first, second and third lists 71, 72 and 73 corresponds to the number of the data portions 31, 32 and 33, which has been created in the previous step 102. In an alternative embodiment the master list may be used as the first list 71, so that it is not necessary to create the first list 71. However, in this preferred embodiment the master list and the first list 71 are separate lists.

In a following step 105 the content of the master list is copied into the first, second and third lists 71, 72 and 73.

A next step 106 rearranges the content of the k-th list in such a way, that the r-th entry of said k-th list is a copy of the $((r+k) \mod n)$-th entry in the master list, wherein n is the number of the first, second and third lists 71, 72 and 73.

If all entries of the data portions 31, 32 and 33 in the master list correspond to data portions 31, 32 and 33, which appears on the tape in that order, the step 106 ensures, that in all of the first, second and third lists 71, 72 and 73 the data portions 31, 32 and 33 are arranged on at most one tape. A discontinuity would occur, if all data portions have to be restored from only one list.

In a next step 107 a restore event is sent to all of the first, second and third lists 71, 72 and 73 except to the master list. Every list, which is not empty, performs the following steps, if it receives a restore event.

Figure 5:
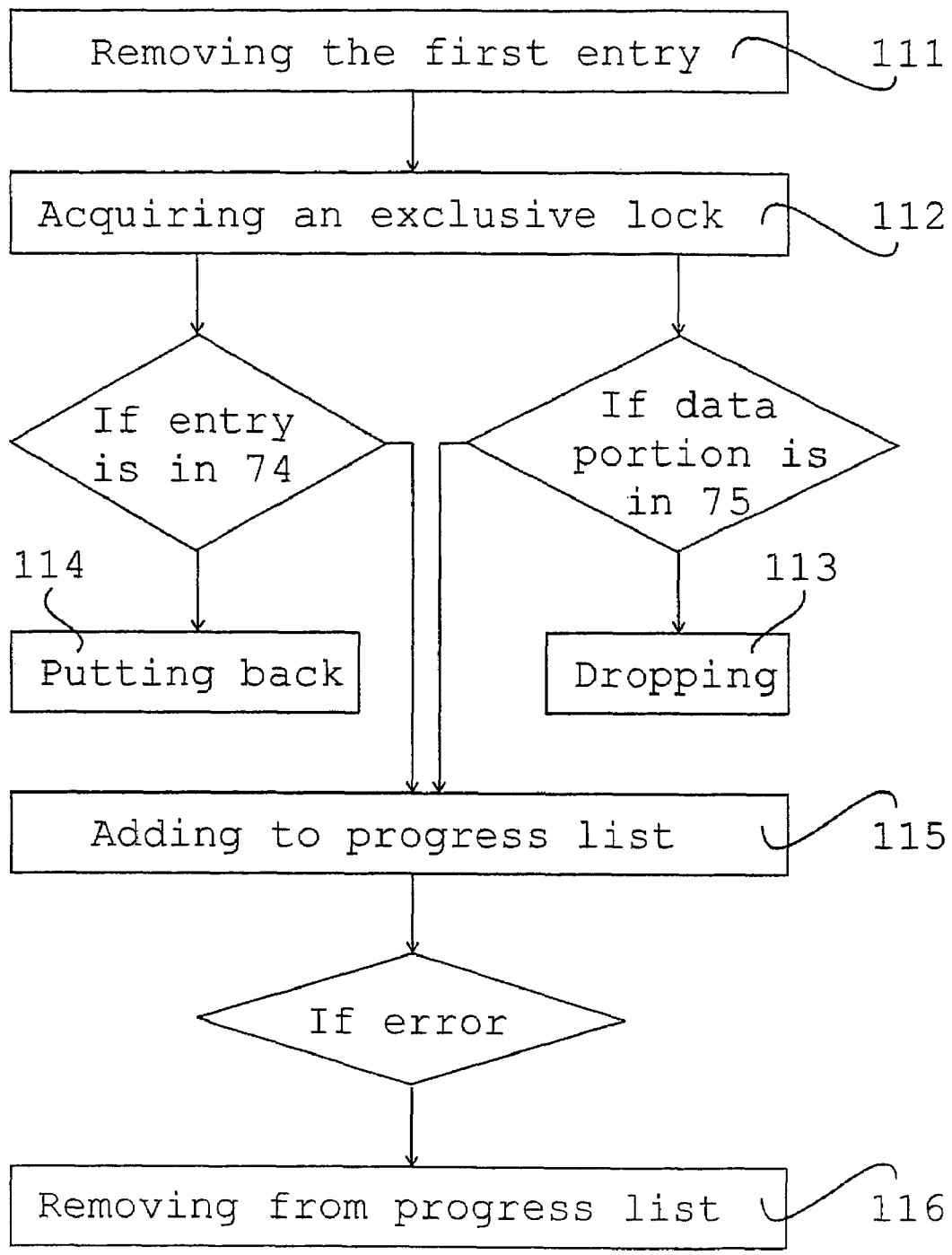
FIG. 5 shows a schematic representation of a detailed flow chart diagram of the continuation of the method according to FIG. 4.

FIG. 5 shows a continuation of the steps according to FIG. 4. The steps in FIG. 5 are performed by those lists, which are not empty, after said lists have received the restore event. All lists can execute these restore events concurrently.

In a first step 111 the first entry is removed from the list. In a next step 112 an exclusive lock is acquired to the progress list 74 and to the success list 75.

If the removed entry is contained in the success list 75, the entry is dropped and the lock is released in a step 113. Then the system waits for new restore events.

If the removed entry is contained in the progress list 74, in a step 114 the entry is putted back to the top of the list and the lock is released. Then the system waits for new restore events.

If the removed entry is contained neither in the progress list 74 nor in the success list 75, in a step 115 the removed entry is added to the progress list 74 and the lock is released. Then the restore performance of the corresponding data portion is started. If the restore is successful, an exclusive lock is acquired to the progress list 74 and to the success list 75 like in the step 112. Further the entries are moved from the progress list 74 to the success list 75, the lock is released and the system waits for new restore events.

If an error occurs, in a step 116 the entry is removed from the progress list 74 and dropped. Depending on the type of error this list is not used during further processing or the system waits for new restore events. Then a restore event is sent to all other lists.

There are three types of errors, which may occur. According to the first type of error, the copy of the data file is not available. Such kinds of data files are filtered in step 101 or in step 116. According to the second type of error, only one data portion is faulty. In this case the step 116 will not be executed. According to the third type of error, several data portions are faulty. If the faulty data portions are known, instead of the step 116 the corresponding entries are removed from the list.

At last, if all lists are empty, but not all data portions are restored, then those copies are used, which has not yet been used.

According to the inventive method all data portions 31, 32 and 33 are in every list in the beginning. Therefore it is possible to restore all data via every list. One of the data portions 31, 32 and 33 is removed from the list only then, if the said data portion 31, 32 or 33 is successfully restored.

If an error occurs, the restore performance is repeated via that list, which is ordered before the faulty list. To start this repetition the restore event has to be sent. If that list is also faulty, then the next list, which is ordered before, is used. If no list exists, which is ordered before, the last list is used.

In particular the inventive method may be used to improve the restore performance of a database log file. New storage technologies, e.g. mainly snapshot technologies, allow reducing the restore time of table space files. These technologies are not applicable to log files, so that the log file of a database becomes a bottleneck. Applying the inventive method to the log file, the access times of the whole database will be improved.

Figure 6:
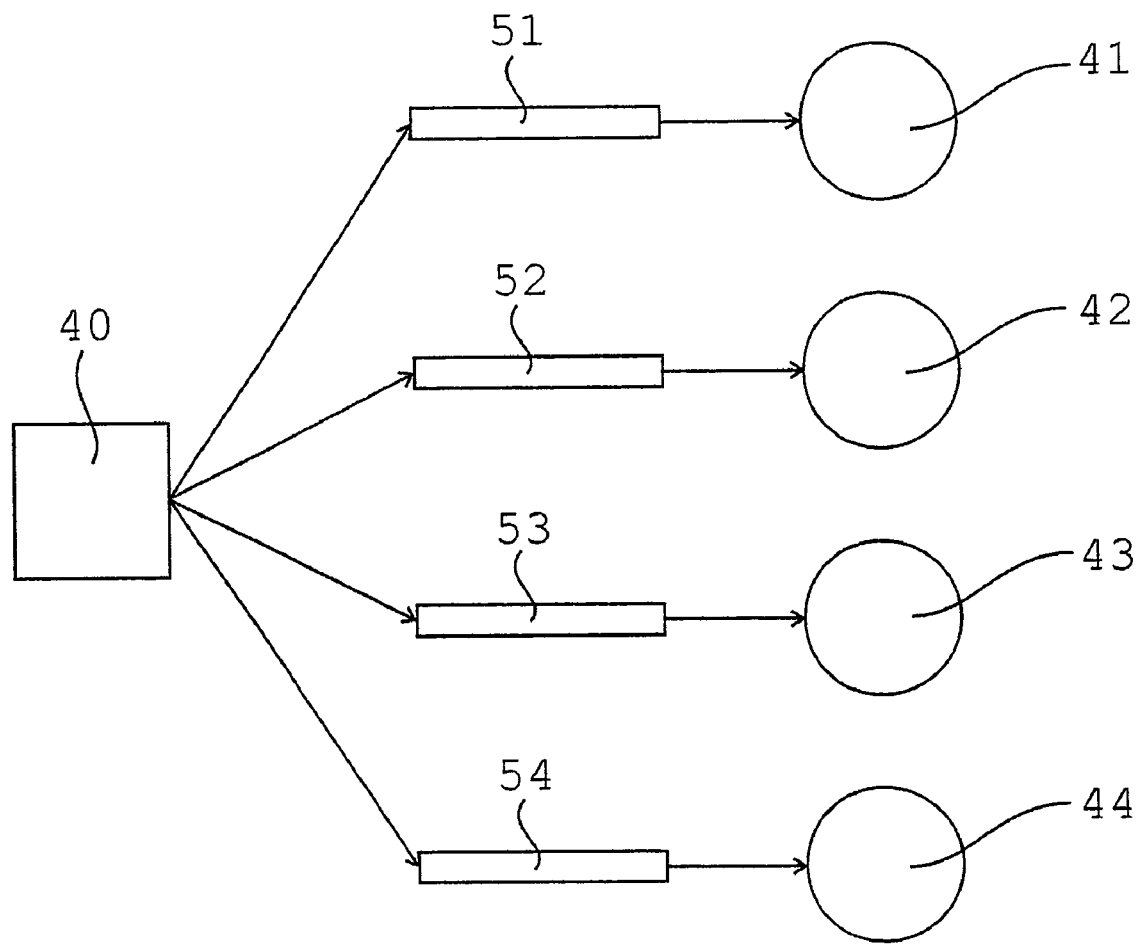
FIG. 6 shows a schematic representation of a first example of a store performance according to the prior art.

FIG. 6 shows a first conventional method for storing a data file 40. Four identical copies of the data file 40 are simultaneously stored via data channels 51, 52, 53 and 54 on independent storage media 41, 42, 43 and 44, respectively. The copies contain the complete information of the data file 40, but not any additional information. Therefore the copies on the storage media 41, 42, 43 and 44 are identical with the data file 40.

Figure 7:
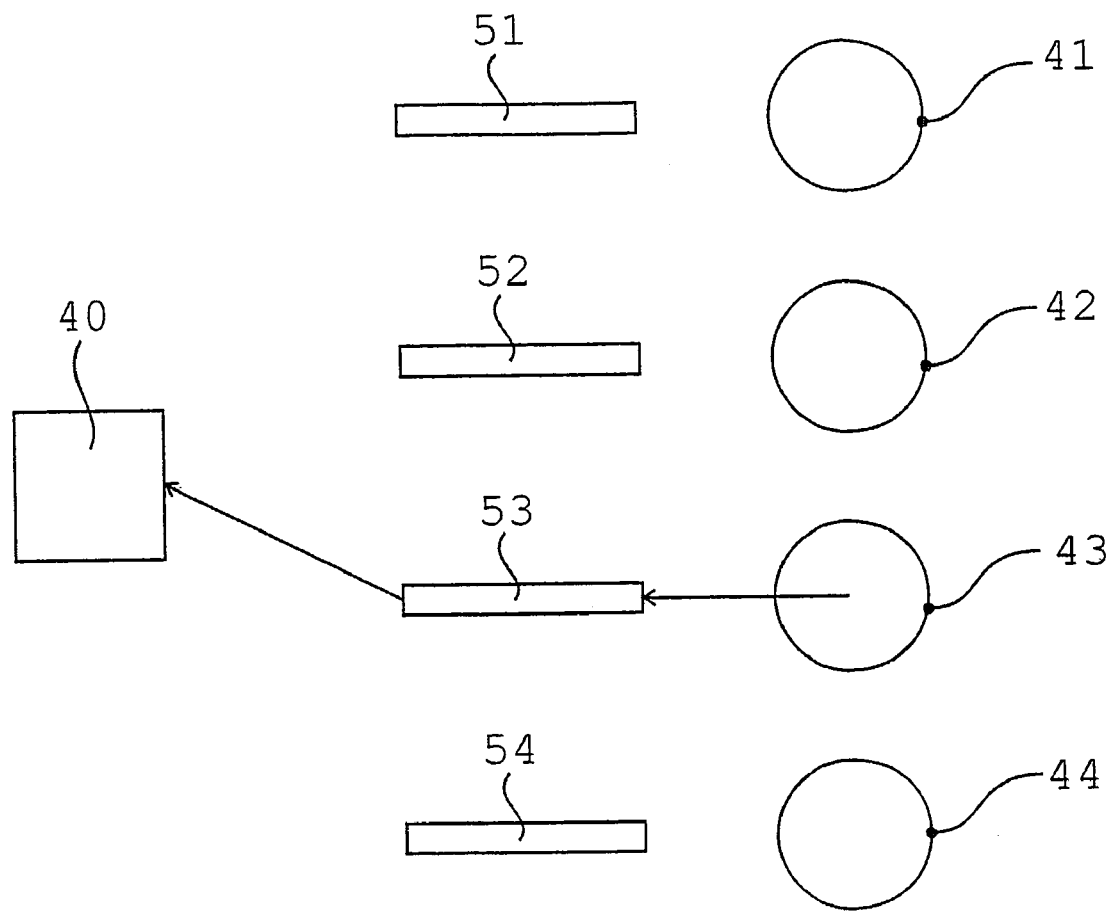
FIG. 7 shows a schematic representation of a first example of a restore performance according to the prior art.

FIG. 7 shows a first conventional method for restoring the data file 40. One of the identical copies is used to restore the data file 40. In this example the copy on the third storage medium 43 is used to restore the data file 40. The copy on the storage medium 43 is read out via the third data channel 53. The copies on the other storage media 41, 42 and 44 remain unused. However, if the currently used storage medium 43 is corrupted or unavailable, a copy on one of the other storage media 41, 42 and 44 is used to restore the data file 40. In this case the time for restoring the data file 40 increases, since the copy of complete data file 40 has to be read out again. This problem is solved by the inventive method, since the data file 10 is subdivided into data portions 31, 32, 33 and 34. Therefore only the data portion on the corrupted storage medium has to be read out again.

Figure 8:
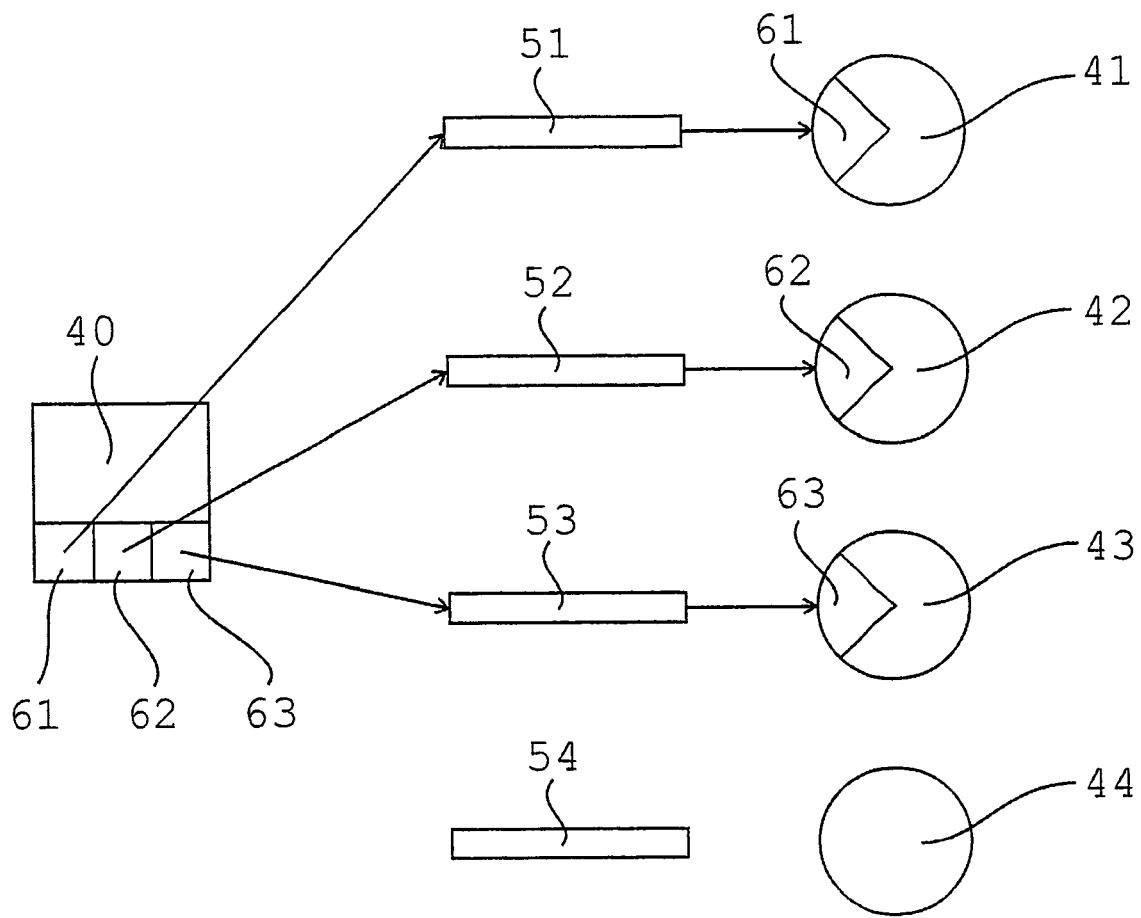
FIG. 8 shows a schematic representation of a second example of a store performance according to the prior art.

FIG. 8 shows schematically a second example of the conventional method for storing the data file. According to said method different data portions of the data file 40 are distributed on the different storage media 41, 42, 43 and 44. In the store performance according to FIG. 8 at first the data file 40 is divided into equal sized data portions 61, 62 and 63. Each of the data partitions 61, 62 and 63 is then associated with one storage medium 41, 42, and 43, respectively. At last the data portions 61, 62 and 63 are moved to the storage media 41, 42, and 43 via the data channels 51, 52 and 53, respectively.

Figure 9:
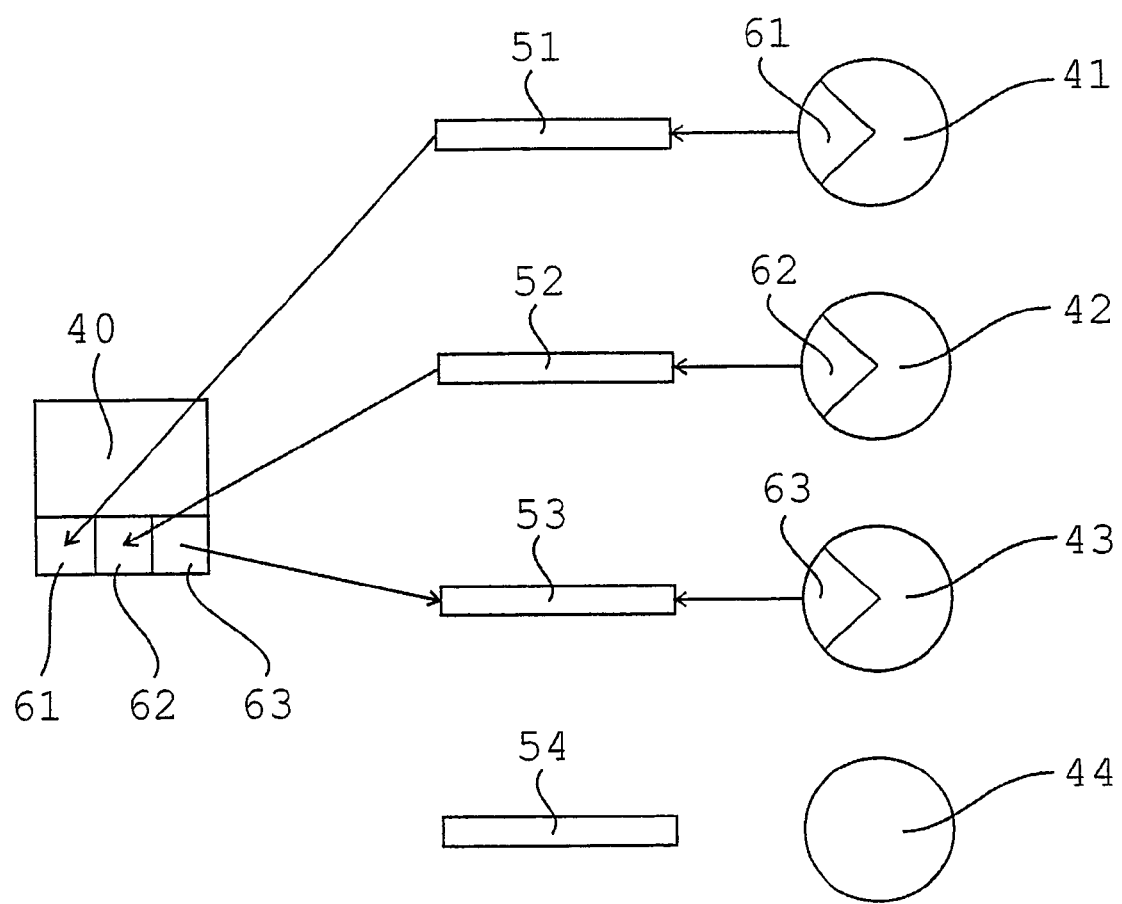
FIG. 9 shows a schematic representation of a second example of a restore performance according to the prior art.

FIG. 9 shows schematically a second restore performance of the data file 40. At first the storage media 41, 42, and 43, which contains the data portions 61, 62 and 63, respectively, are looked up. Next each data portion 61, 62 and 63 is associated with that location, where the data portion 61, 62 and 63 is to be restored to. At last said different data portions 61, 62 and 63 are read out simultaneously via the data channels 51, 52 and 53, respectively, to restore the data file 40.

If only one of the storage media 41, 42 and 43 in FIG. 9 is corrupted or unavailable, it is not possible to restore the original data file 40. This problem is solved by the inventive method, since all or the most of the storage media 11, 12, 13 and 14 contain all data portions 31, 32, 33 and 34 of the data file 10.

The present invention can also be embedded in a computer program product which comprises all the features enabling the implementation of the methods described herein. Further, when loaded in computer system, said computer program product is able to carry out these methods.

Although illustrative embodiments of the present invention have been described herein with reference to the accompanying drawings, it is to be understood that the present invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method comprising:

generating a plurality of copies of a data file;

storing said plurality of copies of said data file in a plurality of storage media;

dividing each copy of said plurality of copies of said data file into a plurality of data portions;

in response to receiving a request to restore said data file, simultaneously retrieving each data portion among said plurality of data portions from a different storage medium among said plurality of storage media; and restoring said data file from said plurality of data portions;

in response to determining a first copy of a data portion among said plurality of data portions is corrupt, retrieving a second copy of said data portion from another storage medium among said plurality of storage media;

creating a plurality of lists including a plurality of entries, wherein said plurality of entries are associated with said plurality of data portions;

rearranging said plurality of entries in said plurality of lists so that said plurality of entries within each list among said plurality of lists is in a different order; and rearranging said plurality of entries in a k-th list among said plurality of lists, wherein a r-th entry among said plurality of entries of said k-th list is a copy of a ((r+k) mod n)-th entry in a reference list.

2. A method comprising:

generating a plurality of copies of a data file;

storing said plurality of copies of said data file in a plurality of storage media;

dividing each copy of said plurality of copies of said data file into a plurality of data portions;

in response to receiving a request to restore said data file, simultaneously retrieving each data portion among said plurality of data portions from a different storage medium among said plurality of storage media; and restoring said data file from said plurality of data portions;

in response to determining a first copy of a data portion among said plurality of data portions is corrupt, retrieving a second copy of said data portion from another storage medium among said plurality of storage media;

wherein said first copy of a data portion is associated with an entry in a predetermined list and said second copy of said data portion is associated with said entry in a different list among said plurality of lists, if said first copy of a data portion is corrupt or not available;

creating a plurality of lists including a plurality of entries, wherein said plurality of entries are associated with said plurality of data portions;

rearranging said plurality of entries in said plurality of lists so that said plurality of entries within each list among said plurality of lists is in a different order; and rearranging said plurality of entries in a k-th list among said plurality of lists, wherein a r-th entry among said plurality of entries of said k-th list is a copy of a ((r+k) mod n)-th entry in a reference list.

* * * * *